United States Patent
Zhang

(10) Patent No.: US 9,904,103 B2
(45) Date of Patent: Feb. 27, 2018

(54) ULTRA THIN DISPLAY MODULE AND METHOD FOR ASSEMBLING THE SAME

(71) Applicant: Shenzhen China Star Optoelectronics Technology Co., Ltd., Shenzhen, Guangdong (CN)

(72) Inventor: Yanxue Zhang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 14/428,365

(22) PCT Filed: Jan. 27, 2015

(86) PCT No.: PCT/CN2015/071611
§ 371 (c)(1),
(2) Date: Mar. 14, 2015

(87) PCT Pub. No.: WO2016/106914
PCT Pub. Date: Jul. 7, 2016

(65) Prior Publication Data
US 2016/0186935 A1    Jun. 30, 2016

(30) Foreign Application Priority Data
Dec. 30, 2014  (CN) .......................... 2014 1 0844560

(51) Int. Cl.
*F21V 9/16*  (2006.01)
*G02F 1/1335*  (2006.01)

(52) U.S. Cl.
CPC .................. *G02F 1/133603* (2013.01); *G02F 2001/133607* (2013.01)

(58) Field of Classification Search
CPC ... F21V 5/04; F21V 5/007; F21K 9/56; F21K 9/90; G02B 3/00
See application file for complete search history.

(56) References Cited

U.S. PATENT DOCUMENTS

2008/0170371 A1* 7/2008 Lai .................... F21V 29/763
361/720
2012/0087122 A1* 4/2012 Takeuchi .......... G02F 1/133603
362/235

FOREIGN PATENT DOCUMENTS

CN        2665747 Y    12/2004
TW        201407213 A   2/2014

* cited by examiner

*Primary Examiner* — Elmito Breval
*Assistant Examiner* — Meghan Ulanday
(74) *Attorney, Agent, or Firm* — Andrew C. Cheng

(57) ABSTRACT

The disclosure provides an ultra thin display module, comprising a LED substrate, a plurality of LED lamp beads, a secondary lens and a display panel. The plurality of LED lamp beads is disposed on the array of the LED substrate, the secondary lens is disposed on the LED substrate, the secondary lens is encapsuled inside the top surface of the LED lamp beads, and the display panel is disposed on the top surface of the secondary lens. The ultra thin display module and method for assembling the same of the disclosure use a brand new structure of ultra thin display module, such that the thickness of the module is greatly decreased as compared with the present techniques.

18 Claims, 2 Drawing Sheets

ULTRA THIN DISPLAY MODULE AND METHOD FOR ASSEMBLING THE SAME

BACKGROUND OF THE INVENTION

1. Field of the Invention

The disclosure relates to the liquid crystal display field, and more particularly, to an ultra thin display module and a method for assembling the same.

2. The Related Arts

Accompanied with the development of the liquid crystal techniques, it is more and more important to decrease the thickness of the products. At present, display modules are assembled by display panels and backlight modules. The thickness of the display modules is decreased by thinning the backlight module. Currently, the backlight module is constituted by iron frames, reflective sheets, backlight plates and optical films. Thus, the thickness of the display modules is decreased by thinning the components in the backlight modules. However, there are limits for the thickness of those components, such that there is a minimum thickness of the display module, and the thickness of the display modules are not thin enough.

SUMMARY

In view of the above problems, the disclosure provides an ultra thin display module and a method for assembling the same such that the thickness of the module is greatly decreased.

In order to accomplish the above purpose, the disclosure provides the following technical solutions.

In one embodiment, the disclosure provides an ultra thin display module, comprising a LED substrate, a plurality of LED lamp beads, a secondary lens and a display panel. The plurality of LED lamp beads is disposed on the array of the LED substrate, the secondary lens is disposed on the LED substrate, the secondary lens is encapsuled inside the top surface of the LED lamp beads, and the display panel is disposed on the top surface of the secondary lens.

In another embodiment, the outer surface of the top of the secondary lens is coated by fluorescence powders.

In another embodiment, the inner surface of the secondary lens, which is opposite to the LED lamp beads, is coated by fluorescence powders.

In another embodiment, the secondary lens is integrally formed, the inner surface of the secondary lens has a plurality of grooves, and the LED lamp beads are embedded into the grooves.

In another embodiment, the secondary lens comprises a plurality of lens units, the plurality of lens units is rectangular, each of the inner surface of the plurality of lens units has a groove, the LED lamp beads are embedded into the grooves, and the plurality of lens units is assembled together closely.

The disclosure further provides a method for assembling an ultra thin display module, comprising:

placing a plurality of LED lamp beads on a LED substrate;

encapsuling a secondary lens on the surface of the LED lamp beads, such that the bottom surface of the secondary lens attaches the LED substrate; and assembling a display panel on the top surface of the secondary lens.

In another embodiment, before the step of assembling a display panel on the top surface of the secondary lens, the method further comprises the step of coating fluorescence powders on the outer surface of the top of the secondary lens.

In another embodiment, before the step of assembling a display panel on the top surface of the secondary lens, the method further comprises the step of coating fluorescence powders on the inner surface of the inner surface of the secondary lens, which is opposite to the LED lamp beads.

In another embodiment, the secondary lens is integrally formed, the inner surface of the secondary lens has a plurality of grooves, and the LED lamp beads are embedded into the grooves.

In another embodiment, the secondary lens comprises a plurality of lens units, the plurality of lens units is rectangular, each of the inner surface of the plurality of lens units has a groove, the LED lamp beads are embedded into the grooves, and the plurality of lens units is assembled together closely.

According to the disclosure, the ultra thin display module and method for assembling the same of the disclosure use a brand new structure of ultra thin display module, such that the thickness of the module is greatly decreased as compared with the present techniques.

BRIEF DESCRIPTION OF THE DRAWINGS

In order to explain the technical solutions of the disclosure more clearly, the brief description of the drawings for explanation of the embodiments is given as below. Apparently, the following drawings are merely some embodiments of the disclosure. For those skilled in the art, the other drawings are attainable without creative endeavor according to these drawings, wherein.

DETAILED DESCRIPTION

The following description with reference to the accompanying drawings is provided to clearly and completely explain the exemplary embodiments of the disclosure. It is apparent that the following embodiments are merely some embodiments of the disclosure rather than all embodiments of the disclosure. According to the embodiments in the disclosure, all the other embodiments attainable by those skilled in the art without creative endeavor belong to the protection scope of the disclosure.

Embodiment 1

Figure 1:
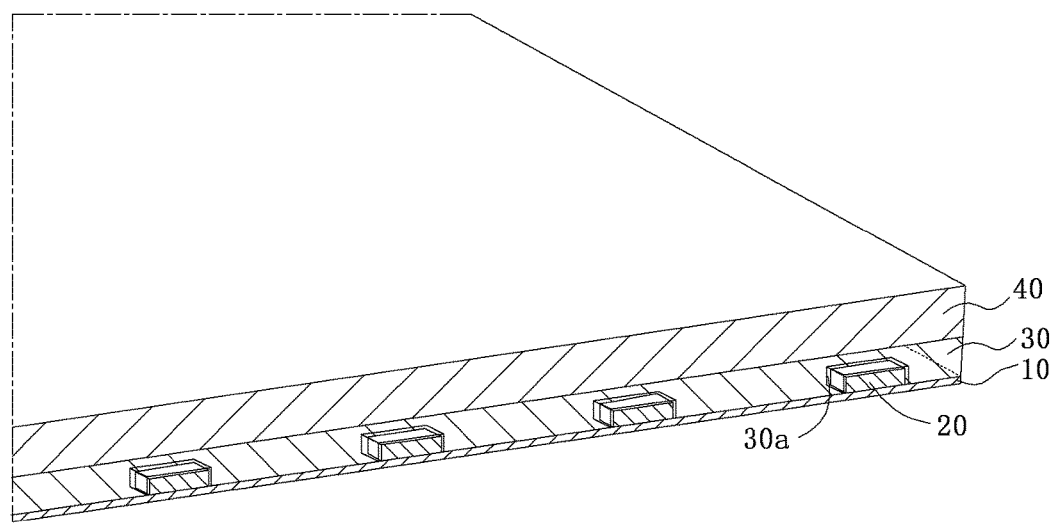
FIG. 1 is the schematic diagram of an ultra thin display module of Embodiment 1 according to the disclosure.
Figure 2:
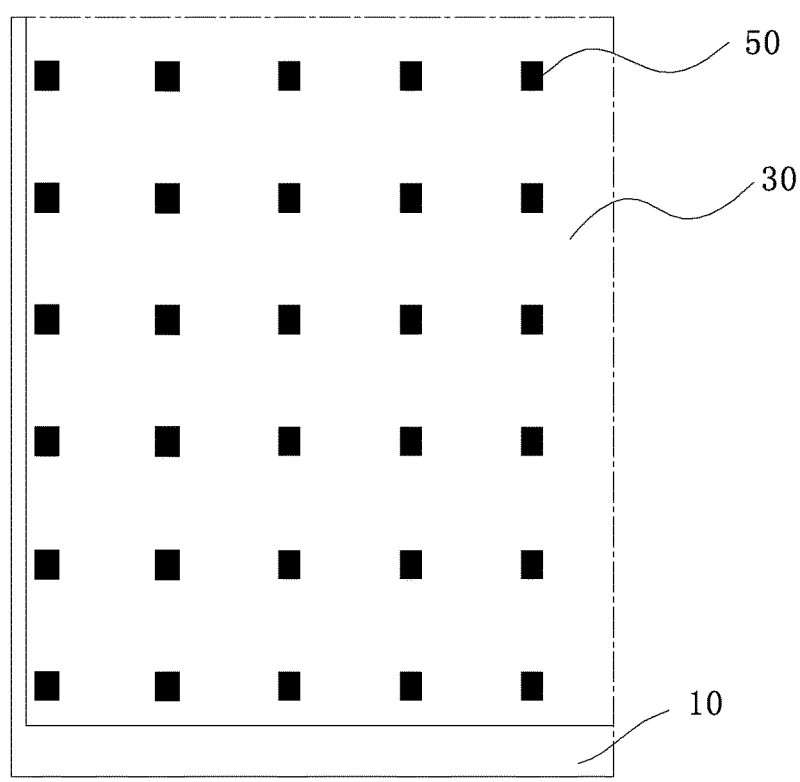
FIG. 2 is the schematic diagram of part of the ultra thin display module of Embodiment 1 according to the disclosure.

Refer to FIGS. 1-2, the ultra thin display module of the disclosure comprises a LED substrate 10, a plurality of LED lamp beads 20, a secondary lens 30 and a display panel 40. The plurality of LED lamp beads 20 is disposed on the array of the LED substrate 10, the secondary lens 30 is disposed on the LED substrate 10, the secondary lens 30 is encapsuled inside the top surface of the LED lamp beads 20, and the display panel 40 is disposed on the top surface of the secondary lens 30.

As compared with the structure of traditional display modules, iron frames, reflective sheets, light guiding plates and optical films are eliminated, so that the display module of the disclosure only comprises a LED substrate 10, a secondary lens 30 and a display panel 40 along the direction of the thickness of the structure, such that the thickness of the display module is greatly decreased and the display module is significantly thin.

The surface of the top of the secondary lens 30 is coated by fluorescence powders 50, such that the display module has appropriate backlight. The outer surface of the top of the secondary lens 30 is coated by fluorescence powders 50. Alternatively, the inner surface of the secondary lens 30, which is opposite to the LED lamp beads 20, is coated by fluorescence powders 50.

In this embodiment, the secondary lens 30 is integrally formed and the secondary lens 30 is rectangular. The inner surface of the secondary lens 30 has a plurality of grooves 30a, and the LED lamp beads 20 are embedded into the grooves 30a. The fluorescence powders 50 are coated on the inner surface of the grooves 30a.

Embodiment 2

Figure 3:
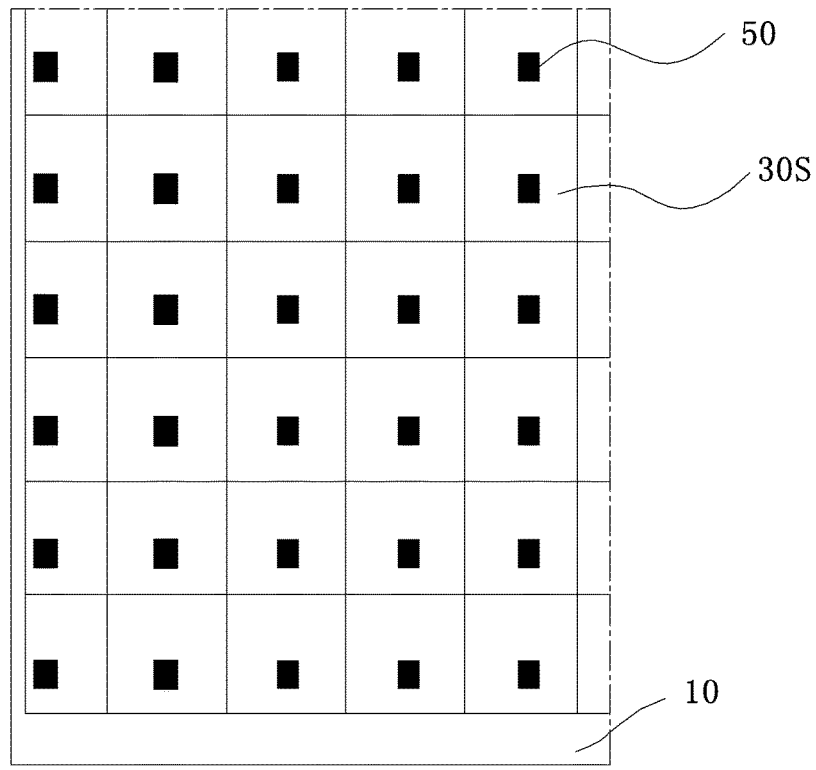
FIG. 3 is the schematic diagram of an ultra thin display module of Embodiment 2 according to the disclosure.

As shown in FIG. 3, the difference between Embodiment 2 and Embodiment 1 is that the secondary lens 30 of the embodiment is assembled by a plurality of lens units 30S. The plurality of lens units 30 is rectangular. Each of the inner surface of the plurality of lens units 30S has a groove 30a, the LED lamp beads 20 are embedded into the grooves 30a, and the plurality of lens units 30S is assembled together closely. The fluorescence powders 50 are coated on the inner surface of the grooves 30a.

Embodiment 3

Figure 4:
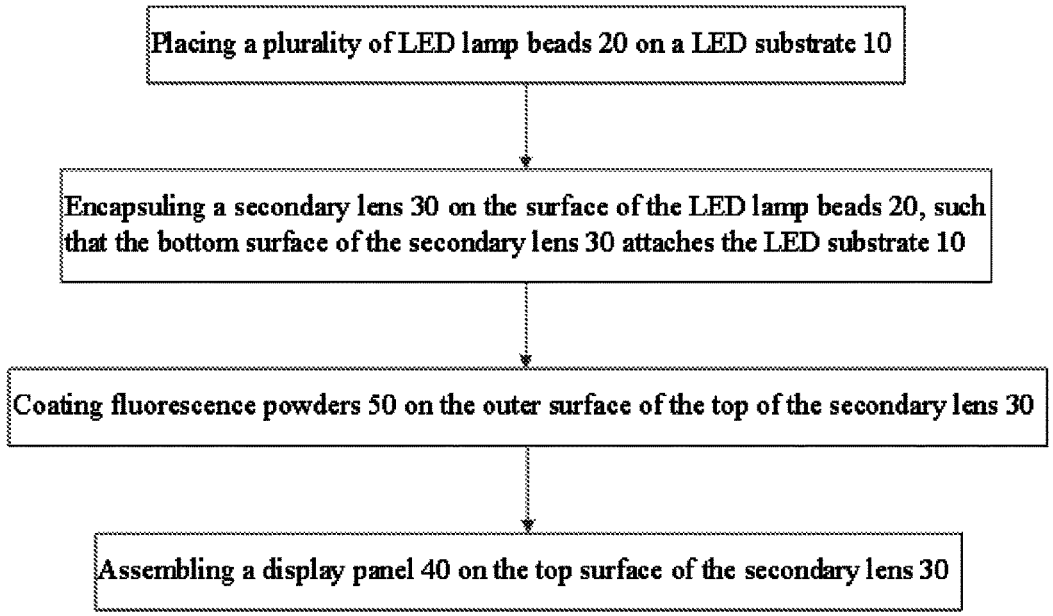
FIG. 4 is the flow chart of a method for assembling an ultra thin display module of Embodiment 3 according to the disclosure.

As shown in FIG. 4, the embodiment provides a method for assembling an ultra thin display module, comprising: placing a plurality of LED lamp beads 20 on a LED substrate 10; encapsuling a secondary lens 30 on the surface of the LED lamp beads 20, such that the bottom surface of the secondary lens 30 attaches the LED substrate 10; and assembling a display panel 40 on the top surface of the secondary lens 30.

Wherein, before the step of assembling a display panel 40 on the top surface of the secondary lens 30, the method further comprises the step of coating fluorescence powders 50 on the outer surface of the top of the secondary lens 30. Alternatively, the method further comprises the step of coating fluorescence powders 50 on the inner surface of the inner surface of the secondary lens 30, which is opposite to the LED lamp beads 20.

Wherein, the secondary lens 30 is integrally formed. Before the step of encapsuling a secondary lens 30 on the surface of the LED lamp beads 20, the method further comprises setting up a plurality of grooves 30a on the inner surface of the secondary lens 30, such that the LED lamp beads 20 can be embedded into the grooves 30a. The fluorescence powders 50 are coated on the inner surface of the grooves 30a. Alternatively, the secondary lens 30 is assembled by a plurality of lens units 30S. The plurality of lens units 30S is rectangular. Each of the inner surface of the plurality of lens units 30S has a groove 30a, the LED lamp beads 20 are embedded into the grooves 30a, and the plurality of lens units 30S is assembled together closely.

According to the embodiments of the disclosure, iron frames, reflective sheets, light guiding plates and optical films are eliminated. The disclosure uses a brand new structure of ultra thin display module, so that the thickness of the module is the summation of the thickness of the LED substrate 10, the thickness of the secondary lens 30 and the thickness of the display panel 40. As compared with the present techniques, the thickness of the display module is greatly decreased and the display module is significantly thin.

Note that the specifications relating to the above embodiments should be construed as exemplary rather than as limitative of the present disclosure. The equivalent variations and modifications on the structures or the process by reference to the specification and the drawings of the disclosure, for example the combination of the technical features in each embodiment, and application to the other relevant technology fields directly or indirectly should be construed similarly as falling within the protection scope of the disclosure.

What is claimed is:

1. An ultra thin display module, comprising:
   a LED substrate;
   a plurality of LED lamp beads, disposed on an array of the LED substrate;
   a lens disposed on the LED substrate and encapsuled inside a top surface of the LED lamp beads; and
   a display panel disposed on the top surface of the lens, wherein the display panel is directly coupled to the top surface of the lens without any structural elements between.

2. The ultra thin display module according to claim 1, wherein the outer surface of the top of the lens is coated by fluorescence powders.

3. The ultra thin display module according to claim 1, wherein the inner surface of the lens, which is opposite to the LED lamp beads, is coated by fluorescence powders.

4. The ultra thin display module according to claim 1, wherein the lens is integrally formed, the inner surface of the lens has a plurality of grooves, and the LED lamp beads are embedded into the grooves.

5. The ultra thin display module according to claim 1, wherein the lens comprises a plurality of lens units, the plurality of lens units is rectangular, each of the inner surface of the plurality of lens units has a groove, the LED lamp beads are embedded into the grooves, and the plurality of lens units is assembled together closely.

6. The ultra thin display module according to claim 2, wherein the lens is integrally formed, the inner surface of the lens has a plurality of grooves, and the LED lamp beads are embedded into the grooves.

7. The ultra thin display module according to claim 2, wherein the lens comprises a plurality of lens units, the plurality of lens units is rectangular, each of the inner surface of the plurality of lens units has a groove, the LED lamp beads are embedded into the grooves, and the plurality of lens units is assembled together closely.

8. The ultra thin display module according to claim 3, wherein the lens is integrally formed, the inner surface of the lens has a plurality of grooves, and the LED lamp beads are embedded into the grooves.

9. The ultra thin display module according to claim 3, wherein the lens comprises a plurality of lens units, the plurality of lens units is rectangular, each of the inner surface of the plurality of lens units has a groove, the LED lamp beads are embedded into the grooves, and the plurality of lens units is assembled together closely.

10. A method for assembling an ultra thin display module, comprising:

placing a plurality of LED lamp beads on a LED substrate;

encapsuling a lens on a surface of the LED lamp beads, such that a bottom surface of the lens attaches the LED substrate; and assembling a display panel on a top surface of the lens, wherein the display panel is directly coupled to the top surface of the lens without any structural elements between.

11. The method for assembling an ultra thin display module according to claim 10, wherein before the step of assembling a display panel on the top surface of the lens, further comprising the step of coating fluorescence powders on the outer surface of the top of the lens.

12. The method for assembling an ultra thin display module according to claim 10, wherein before the step of assembling a display panel on the top surface of the lens, further comprising the step of coating fluorescence powders on the inner surface of the inner surface of the lens, which is opposite to the LED lamp beads.

13. The method for assembling an ultra thin display module according to claim 10, wherein the lens is integrally formed, the inner surface of the lens has a plurality of grooves, and the LED lamp beads are embedded into the grooves.

14. The method for assembling an ultra thin display module according to claim 11, wherein the lens is integrally formed, the inner surface of the lens has a plurality of grooves, and the LED lamp beads are embedded into the grooves.

15. The method for assembling an ultra thin display module according to claim 12, wherein the lens is integrally formed, the inner surface of the lens has a plurality of grooves, and the LED lamp beads are embedded into the grooves.

16. The method for assembling an ultra thin display module according to claim 10, wherein the lens comprises a plurality of lens units, the plurality of lens units is rectangular, each of the inner surface of the plurality of lens units has a groove, the LED lamp beads are embedded into the grooves, and the plurality of lens units is assembled together closely.

17. The method for assembling an ultra thin display module according to claim 11, wherein the lens comprises a plurality of lens units, the plurality of lens units is rectangular, each of the inner surface of the plurality of lens units has a groove, the LED lamp beads are embedded into the grooves, and the plurality of lens units is assembled together closely.

18. The method for assembling an ultra thin display module according to claim 12, wherein the lens comprises a plurality of lens units, the plurality of lens units is rectangular, each of the inner surface of the plurality of lens units has a groove, the LED lamp beads are embedded into the grooves, and the plurality of lens units is assembled together closely.

* * * * *